(12) United States Patent
Song et al.

(10) Patent No.: US 11,779,814 B2
(45) Date of Patent: Oct. 10, 2023

(54) POLYURETHANE GOLF BALL

(71) Applicant: VOLVIK INC., Chungcheongbuk-Do (KR)

(72) Inventors: Chui Ho Song, Gyeonggi-do (KR); Seung Geun Park, Chungcheongbuk-do (KR); Geon Sim, Seoul (KR); Kyung Ahn Moon, Seoul (KR)

(73) Assignee: VOLVIK INC., Chungcheongbuk-Do (KR)

( * ) Notice: Subject to any disclaimer, the term of this patent is extended or adjusted under 35 U.S.C. 154(b) by 301 days.

(21) Appl. No.: 17/370,193

(22) Filed: Jul. 8, 2021

(65) Prior Publication Data
US 2022/0062713 A1 Mar. 3, 2022

(30) Foreign Application Priority Data

Aug. 26, 2020 (KR) .................... 10-2020-0107516
Jan. 7, 2021 (KR) .................... 10-2021-0001827

(51) Int. Cl.
*A63B 37/06* (2006.01)
*A63B 37/00* (2006.01)
*C08L 75/08* (2006.01)
*C08F 136/06* (2006.01)
*C08L 23/08* (2006.01)
(Continued)

(52) U.S. Cl.
CPC ...... *A63B 37/00373* (2020.08); *A63B 37/005* (2013.01); *A63B 37/0039* (2013.01); *C08F 136/06* (2013.01); *C08G 18/10* (2013.01); *C08G 18/3206* (2013.01); *C08G 18/3212* (2013.01); *C08G 18/42* (2013.01); *C08G 18/48* (2013.01); *C08G 18/73* (2013.01); *C08G 18/755* (2013.01); *C08G 18/758* (2013.01); *C08G 18/7621* (2013.01); *C08K 5/0025* (2013.01); *C08K 5/29* (2013.01); *C08L 23/0869* (2013.01); *C08L 75/06* (2013.01); *C08L 75/08* (2013.01)

(58) Field of Classification Search
CPC ................................................. A63B 37/0023
See application file for complete search history.

(56) References Cited

U.S. PATENT DOCUMENTS

| 3,395,109 A | 7/1968 | Molitor et al. |
| 4,248,432 A | 2/1981 | Hewitt et al. |

(Continued)

FOREIGN PATENT DOCUMENTS

| KR | 10-2006-0115591 A | 11/2006 |
| KR | 10-1047087 B1 | 7/2011 |

(Continued)

*Primary Examiner* — Raeann Gorden
(74) *Attorney, Agent, or Firm* — The PL Law Group, PLLC

(57) ABSTRACT

A golf ball according to an embodiment of the present disclosure is covered with an injection-molded crosslinked polyurethane. The golf ball may have excellent scuff resistance and light resistance of a cover as well as excellent driving distance and spin by using a cover composition containing crosslinked polyurethane obtained by adding a crosslinking agent to thermoplastic polyurethane (TPU). A polyurethane cover composition according to an embodiment can make it possible to prepare a crosslinked polyurethane cover by injection molding without the burden of facility investment cost.

10 Claims, 6 Drawing Sheets

(51) Int. Cl.
*C08G 18/10* (2006.01)
*C08G 18/48* (2006.01)
*C08G 18/42* (2006.01)
*C08G 18/32* (2006.01)
*C08G 18/75* (2006.01)
*C08G 18/73* (2006.01)
*C08G 18/76* (2006.01)
*C08K 5/00* (2006.01)
*C08K 5/29* (2006.01)
*C08L 75/06* (2006.01)

(56) References Cited

U.S. PATENT DOCUMENTS

| | | |
|---|---|---|
| 4,442,282 A | 4/1984 | Kolycheck |
| 6,258,310 B1 | 7/2001 | Sardanopoli et al. |
| 2009/0230587 A1 | 9/2009 | Dewanjee et al. |
| 2011/0136587 A1* | 6/2011 | Ricci ................ A63B 37/0003 473/378 |
| 2014/0187348 A1* | 7/2014 | Kim ................ A63B 45/00 473/371 |

FOREIGN PATENT DOCUMENTS

| | | |
|---|---|---|
| KR | 10-1437411 B1 | 9/2014 |
| KR | 10-1518108 B1 | 5/2015 |

\* cited by examiner

POLYURETHANE GOLF BALL

CROSS REFERENCE TO RELATED APPLICATIONS AND CLAIM OF PRIORITY

This application claims the benefit of Korean Patent Application Nos. 10-2020-0107516 filed on Aug. 26, 2020 and 10-2021-0001827 filed on Jan. 7, 2021, in the Korean Intellectual Property Office, the disclosures of which are incorporated herein by reference in its entirety.

BACKGROUND

1. Technical Field

The present disclosure relates to a golf ball covered with an injection-molded crosslinked polyurethane cover with excellent scuff resistance and light resistance, more particularly to a polyurethane golf ball with excellent scuff resistance and light resistance of a cover as well as excellent driving distance and spin by using a cover composition containing crosslinked polyurethane obtained by adding a crosslinking agent to thermoplastic polyurethane (TPU).

2. Background Art

At present, the cover of premium-grade golf balls has mainly a dual cover structure consisting of an outer cover and an inner cover.

As the inner cover, a SURLYN®-based ionomer resin is typically used. The ionomer resin, which is strong and rigid, protects the inner core when the golf ball is hit and greatly increases driving distance by delivering force wholly to the center.

As the outer cover, a soft and tough polyurethane resin is typically used.

A three-piece golf ball is obtained when the dual cover is combined with a single core, and a four-piece golf ball is obtained when it is combined with a dual core.

The dual cover structure of the golf ball is employed to satisfy various properties required for the golf ball, such as driving distance, spin, hitting characteristics, rebound resilience, etc.

As a material of the outer cover, polyurethane is commonly used to allow easier control over the amount of spin when the golf ball is hit with an iron. The polyurethane used for the golf ball cover is largely classified into thermosetting polyurethane and thermoplastic polyurethane (TPU).

For preparation of thermosetting polyurethane into a golf ball cover, a casting molding method of adding solutions of a prepolymer and a curing agent together is commonly used. However, the casting method has the problems that the control of reaction rate is difficult because the curing reaction is carried out after the solutions of the prepolymer and the curing agent are added separately and then mixed, the productivity is not good because time is necessary for the curing, and high initial investment cost is required to establish a long casting line for a continuous process.

Thermoplastic polyurethane (TPU) is highly advantageous in that injection molding is possible because it has thermoplasticity due to a linear molecular structure. Injection molding using the thermoplastic polyurethane material is very desirable method for molding the golf ball cover owing to high productivity due to very short molding time as compared to the casting of thermosetting polyurethane.

U.S. Pat. Nos. 3,395,109, 4,248,432, 4,442,282, etc. previously proposed a golf ball using thermoplastic polyurethane. However, the golf ball cover was not satisfactory in terms of hitting characteristics, spin control, scuff resistance, light resistance, etc.

U.S. Pat. No. 6,258,310 disclosed a technology of modifying thermoplastic polyurethane (TPU) using an extruder, wherein an MDI (methylene diphenyl diisocyanate)-terminated prepolymer is added to TPU to introduce crosslinkage. In addition, US Patent Publication No. 2009-0230587 disclosed a method for preparing partially crosslinked thermoplastic polyurethane by mixing a monomeric MDI and an aromatic diamine in thermoplastic polyurethane (TPU) and a method for manufacturing a golf ball cover by injection-molding the same.

Since these US patents use an aromatic isocyanate and an aromatic amine, the yellowing of the prepared PU cover upon exposure to light could not be avoided.

Korean Patent Publication No. 2006-0115591 disclosed a golf ball with rebound resilience and scuff resistance improved by introducing a crosslinking agent to an isocyanate master batch (Crossnate EM30, MDI content=30%) in order to crosslink PTMG-MDI-BD thermoplastic polyurethane. However, yellowing due to long-term exposure to light could not be avoided because the aromatic isocyanate MDI is a basic unit.

Korean Patent Registration No. 1047087 disclosed a golf ball with excellent scuff resistance by crosslinking thermoplastic polyurethane using an unsaturated diol, i.e., trimethylolpropane monoallyl ether (TMPME) having a double bond, as a chain extender and using a free radical reaction initiator. However, it is difficult to control crosslinkage once the reaction is initiated and the prepared resin can be hardly used for injection molding since its property is the same as that of the thermosetting resin.

Korean Patent Registration No. 1518108 pointed out that the use of thermoplastic polyurethane leads to weak scuff resistance upon hitting by an iron although excellent rebound resilience and spin performance can be achieved and, in order to solve this problem, disclosed that physical properties were improved by replacing some of the polyol reacted with an aromatic isocyanate for synthesis of polyurethane with a hyperbranched polyol.

Korean Patent Registration No. 1437411 disclosed that a golf ball cover composition with improved scuff resistance was obtained by replacing some of the polyol for preparation of polyurethane with a hyperbranched polyol and using an acrylate having a hydroxyl group.

Although these Korean patents attempted to improve physical properties by introducing partial crosslinkage by mixing some of the polyol used for preparation of a thermoplastic polyurethane resin with an acrylate having a hydroxyl group or a double bond, the yellowing phenomenon occurring upon long-term exposure to light due to weak light resistance could not be avoided because an aromatic isocyanate was used. Therefore, they are not suitable for a golf ball including a colored (pigmented) outer cover.

SUMMARY

The inventors of the present disclosure have made efforts to develop a golf ball including a cover with excellent scuff resistance and light resistance. As a result, they have identified that scuff resistance, light resistance, etc. can be improved by using partially crosslinked polyurethane obtained by reacting thermoplastic polyurethane with a specific crosslinking agent in an outer cover, and have completed the present disclosure.

The present disclosure is directed to providing a golf ball including:
 a core containing a polybutadiene rubber;
 an inner cover containing an ionomer resin; and
 an outer cover containing crosslinked polyurethane formed by reaction of thermoplastic polyurethane and a crosslinking agent, wherein the crosslinking agent includes an isocyanate crosslinking agent and a compound represented by Chemical Formula 1:

[Chemical Formula 1]

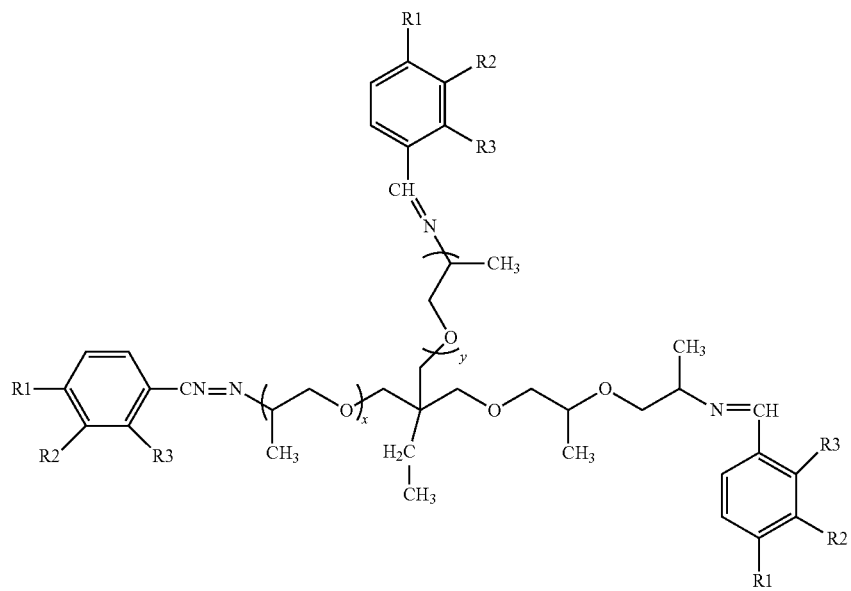

wherein each of R1, R2 and R3 is independently H, OH or a $C_1$-$C_{10}$ alkoxy group, with one of R1, R2 and R3 being OH, and each of x and y is independently an integer of 1-2.

The thermoplastic polyurethane may be obtained by reacting at least one long-chain polyol selected from a group consisting of aliphatic polyether polyol and polyester polyol.

The thermoplastic polyurethane may be obtained by reacting at least one diisocyanate selected from a group consisting of HDI (hexamethylene diisocyanate), IPDI (isophorone diisocyanate), $H_{12}$MDI (4,4'-dicyclohexylmethane diisocyanate) and 1,4-$H_6$XDI (1,4-hydrogenated xylene diisocyanate).

The thermoplastic polyurethane may include at least one chain extender selected from ethylene glycol, diethylene glycol, 1,3-propanediol, 1.3-butanediol, 1,4-butanediol, 1,5-pentanediol, 1,6-hexanediol, bishydroxymethylcyclohexane and cyclohexane-1,4-diol.

The crosslinked polyurethane may have a Shore D hardness of 30-60.

The isocyanate crosslinking agent may be at least one compound selected from HDI (hexamethylene diisocyanate), IPDI (isophorone diisocyanate), $H_{12}$MDI (dicyclohexylmethane diisocyanate), HDI isocyanurate (t-HDI) and IPDI isocyanurate (t-IPDI).

The crosslinked polyurethane may be formed as 100 parts by weight of the thermoplastic polyurethane reacts with 0.1-20 parts by weight of the crosslinking agent.

The crosslinked polyurethane may have a degree of crosslinking of 10-90.

The crosslinked polyurethane may experience color change (ΔE) of 8 or less after exposure to irradiance of 1 SUN (1,000 W/m²) for 120 hours.

The ionomer resin may be a copolymer of ethylene and unsaturated carboxylic acid with a part of the unsaturated carboxylic acid being neutralized with a monovalent or divalent metal ion.

The polyurethane cover composition according to the present disclosure can be prepared into a crosslinked polyurethane cover by injection molding without the burden of facility investment cost since no additional casting molding facility is necessary.

In addition, when an outer cover of a golf ball is prepared using the polyurethane cover composition of the present disclosure, the driving distance, spin control performance, scuff resistance and light resistance of the golf ball can be improved greatly.

DETAILED DESCRIPTION

Figure 1:
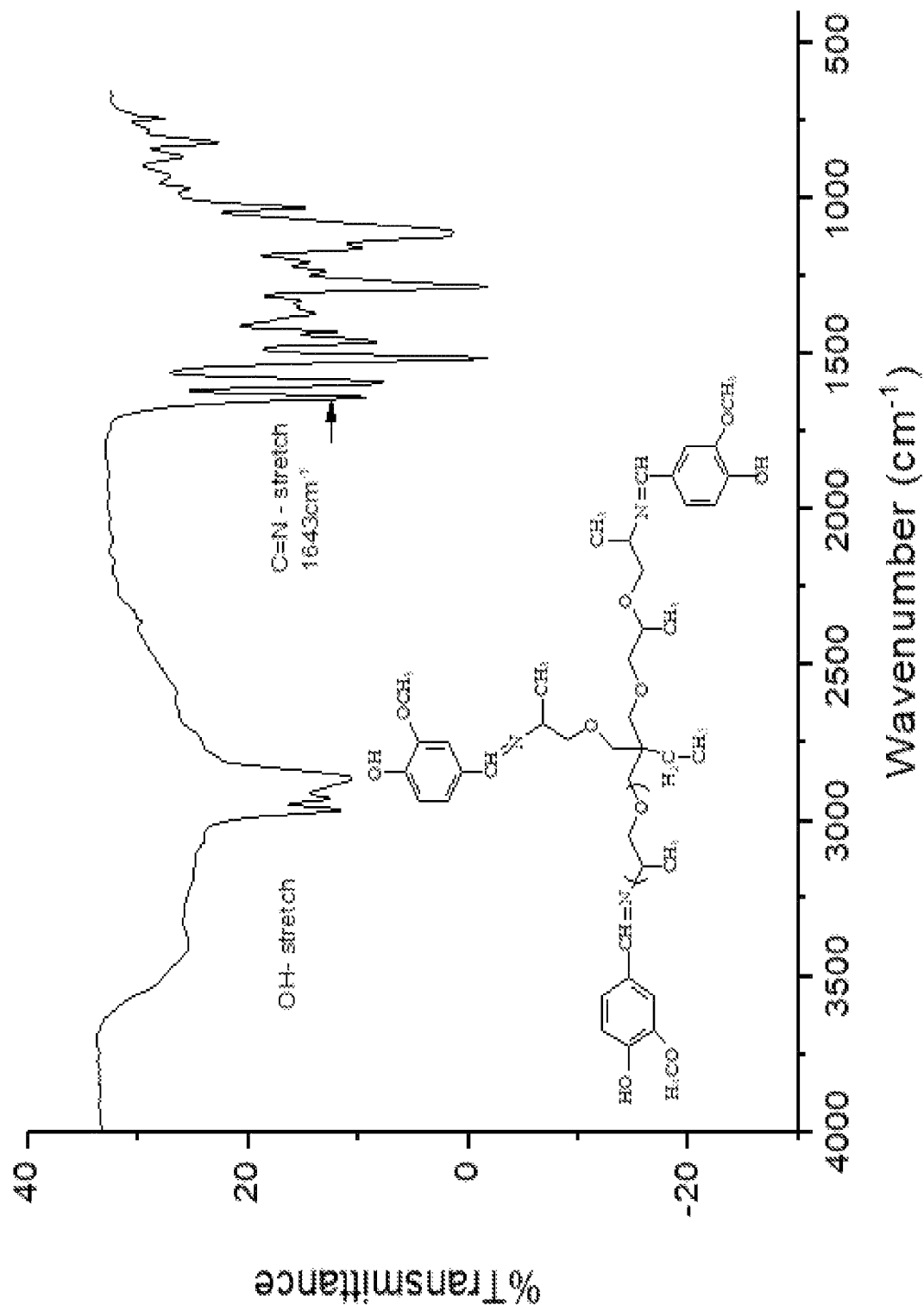
FIG. 1 shows the FT-IR spectrum of a crosslinking agent prepared in Preparation Example 1.

Hereinafter, the present disclosure is described in detail. The terms used in the specification and claims should not be understood to be limited by the common or dictionary meanings, but should be understood within the context of the present disclosure based on the principle that the concept of the terms can be adequately defined by an inventor to best describe his/her own invention.

The present disclosure provides a golf ball including:
a core containing a polybutadiene rubber;
an inner cover containing an ionomer resin, which is a copolymer of ethylene and unsaturated carboxylic acid with a part of the unsaturated carboxylic acid being neutralized with a monovalent or divalent metal ion; and
an outer cover containing crosslinked polyurethane formed by reaction of thermoplastic polyurethane and a crosslinking agent, The crosslinked polyurethane may be obtained by adding a crosslinking agent to non-yellowing-type thermoplastic polyurethane (TPU) and then performing extrusion reaction.

Whereas a casting method is commonly used to prepare an outer cover of a golf ball using urethane, the present disclosure provides crosslinked polyurethane which allows the preparation of a urethane cover of a golf ball by injection molding.

The thermoplastic polyurethane is not particularly limited as long as it is one commonly used for preparation of a golf ball. More specifically, at least one compound selected from aliphatic polyether polyol and polyester polyol as a high-molecular-weight long-chain polyol having excellent light resistance and constituting the soft segment of thermoplastic polyurethane may be used. More specifically, the aliphatic polyester polyol may be, for example, polyethylene adipate diol, polypropylene adipate diol or polybutylene adipate diol, although not being limited thereto. As the polyether diol, PTMG (polytetramethylene glycol) with a molecular weight of 800-3000 may be used, although not being limited thereto.

In the thermoplastic polyurethane, as the diisocyanate which forms urethane bonding by reacting with the high-molecular-weight long-chain diol, an aliphatic diisocyanate or an alicyclic diisocyanate with excellent light resistance may be used either alone or in combination. The diisocyanate may be selected from a group consisting of HDI (hexamethylene diisocyanate), IPDI (isophorone diisocyanate), $H_{12}$MDI (4,4'-dicyclohexylmethane diisocyanate) and 1,4-$H_6$XDI (trans-1,4-hydrogenated xylylene diisocyanate), although not being limited thereto.

In addition, a low-molecular-weight diol such as an aromatic diol or an aliphatic diol may be used as a chain extender constituting the thermoplastic polyurethane. More specifically, an aliphatic diol with excellent light resistance is preferred. More specifically, an aliphatic diol such as ethylene glycol, diethylene glycol, 1,3-propanediol, 1,3-butanediol, 1,4-butanediol, 1,5-pentanediol, 1,6-hexanediol, etc. may be used, although not being limited thereto. And, the alicyclic diol may be, for example, bishydroxymethyl-cyclohexane, cyclohexane-1,4-diol, etc., although not being limited thereto.

The thermoplastic polyurethane may have a Shore D hardness of specifically 30-60, more specifically 35-55. If the Shore D hardness is below 30, the cover may be damaged easily. And, if it exceeds 60, spin performance may be unsatisfactory.

As a crosslinking agent compound for crosslinking the thermoplastic polyurethane, an isocyanate-based crosslinking agent such as polyisocyanate, polyisocyanurate, etc. may be used.

The isocyanate crosslinking agent may be at least one non-yellowing type crosslinking agent selected from HDI (hexamethylene diisocyanate), IPDI (isophorone diisocyanate), $H_{12}$MDI (dicyclohexylmethane diisocyanate), HDI isocyanurate (t-HDI) and IPDI isocyanurate (t-IPDI).

In addition, MDI (methylene diphenyl diisocyanate), TDI (toluene diisocyanate) or t-MDI (MDI trimer) having an intramolecular benzene structure may also be used as the isocyanate crosslinking agent. The crosslinking agent having an intramolecular benzene structure may be added in an amount of 0.1-10 parts by weight based on 100 parts by weight of the non-yellowing type crosslinking agent, so that light resistance is not affected significantly.

As the crosslinking agent compound, polyisocyanurate such as MDI isocyanurate (t-MDI), TDI isocyanurate (t-TDI), HDI isocyanurate (t-HDI), IPDI isocyanurate (t-IPDI), etc. may be used. More specifically, non-yellowing type HDI isocyanurate (t-HDI) or IPDI isocyanurate (t-IPDI) with excellent light resistance may be used. When MDI isocyanurate (t-MDI) or TDI isocyanurate (t-TDI) is used, it may be added in an amount of 0.1-10 parts by weight based on 100 parts by weight of the non-yellowing type polyisocyanurate, so that light resistance is not affected significantly.

The polyisocyanurate may be advantageous to form a crosslinked network structure since it forms a hexagonal ring with three isocyanate (NCO) functional groups arranged with an angle of 120°.

The polyisocyanate crosslinking agent compound may form an allophanate bond by reacting with the urethane bond of TPU in an extruder. The formed network structure is thermally very stable.

In addition, the crosslinking agent includes a crosslinking agent compound represented by Chemical Formula 1.

[Chemical Formula 1]

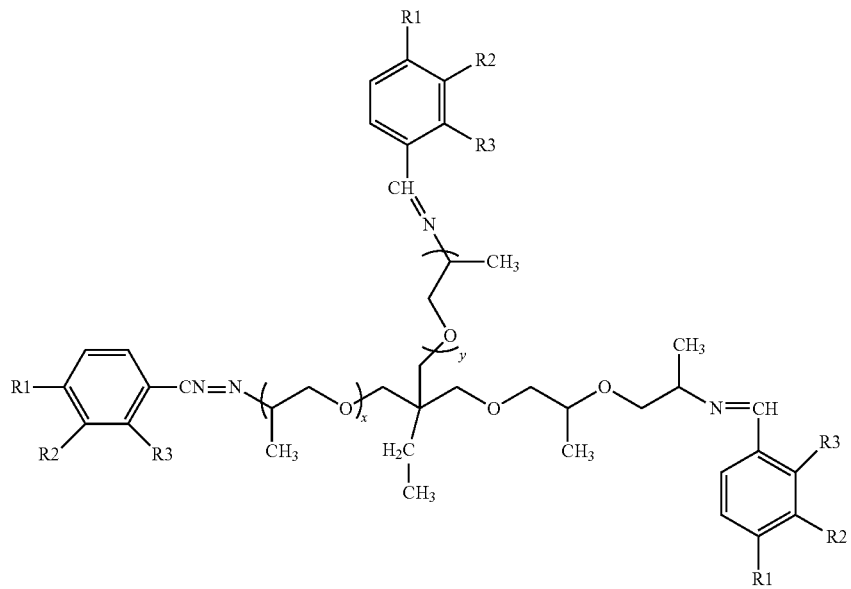

In Chemical Formula 1, each of R1, R2 and R3 is independently H, OH or a $C_1$-$C_{10}$ alkoxy group, with one of R1, R2 and R3 being OH, and each of x and y is independently an integer of 1-2.

The crosslinking agent compound may be prepared by reacting a compound represented by Chemical Formula 2 with a compound represented by Chemical Formula 3.

[Chemical Formula 2]

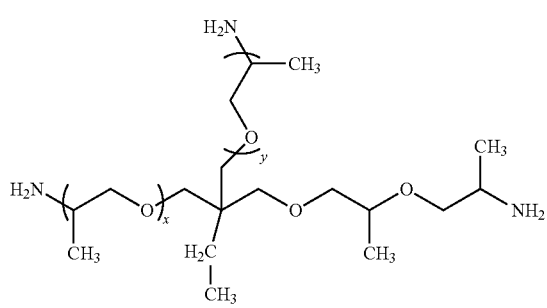

In Chemical Formula 2,
each of x and y is independently an integer of 1-2.

[Chemical Formula 3]

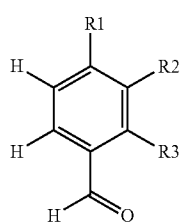

In Chemical Formula 3, each of R1, R2 and R3 is independently H, OH or a $C_1$-$C_{10}$ alkoxy group, which may be the same or different from each other.

The crosslinking agent compound may be a compound represented by Chemical Formula 4.

[Chemical Formula 4]

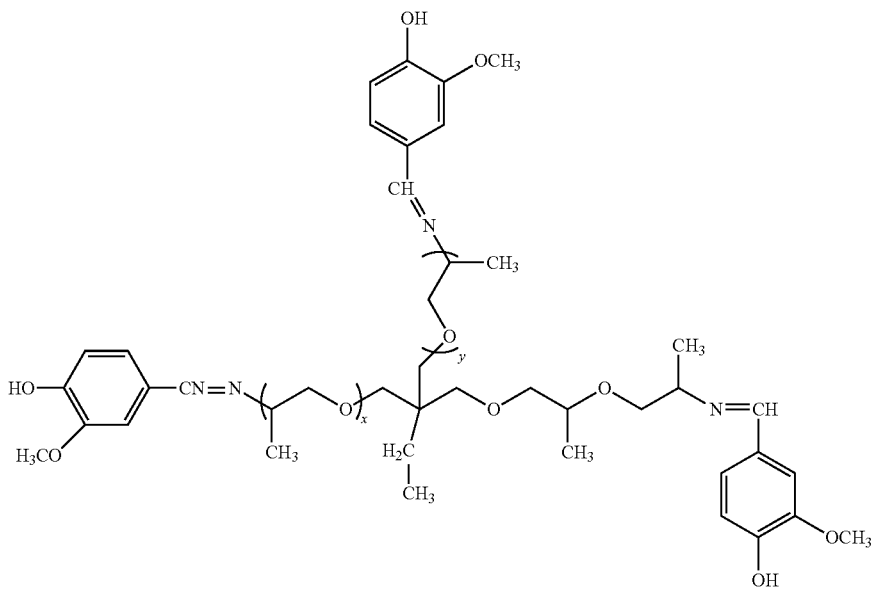

In Chemical Formula 4,
each of x and y is independently an integer of 1-2.

In the present disclosure, the isocyanate-based crosslinking agent and the crosslinking agent of Chemical Formula 1 may be used at a ratio of 1:0.1-10 parts by weight, specifically 1:0.5-5 parts by weight, most specifically 1:0.8-3 parts by weight.

In the present disclosure, the content of the crosslinking agent may be adjusted for control of the degree of crosslinking. The crosslinking agent may be used in an amount of 0.1-20 parts by weight, specifically 0.5-15 parts by weight, more specifically 1-10 parts by weight, more specifically 1-5 parts by weight, based on 100 parts by weight of the thermoplastic polyurethane resin. When the crosslinking agent compound is used in a smaller amount, crosslinking may not occur sufficiently. And, if the crosslinking agent compound is used in a larger amount, it is difficult to achieve good injection moldability at 150° C. or above because the degree of crosslinking becomes 99% or higher.

The crosslinked polyurethane may have a degree of crosslinking of 10-90.

Due to the crosslinked structure, the crosslinked polyurethane may have improved scuff resistance owing to enhanced physical properties such as tensile strength, tear strength, etc. and may have very improved light resistance.

In particular, the crosslinked polyurethane may experience color change (ΔE) of 8 or less after exposure to irradiance of 1 SUN (1,000 W/m²) for 120 hours.

The outer cover of a golf ball of the present disclosure may further contain a commonly used additive. The additive may be, for example, a thermoplastic polymer excluding thermoplastic polyurethane (TPU), a pigment with desired color, an antioxidant, a UV absorbent, an organic or inorganic filler, etc., although not being specially limited thereto. The thermoplastic polymer may be selected adequately for hardness control of the cover, improvement of resilience, improvement of injection moldability, improvement of interfacial adhesivity, etc. For example, polyester resin, nylon resin, ionomer resin, polyethylene, etc. may be used.

Specifically, the additive may be added in an amount of 0.1-5 parts by weight based on 100 parts by weight of the thermoplastic polyurethane resin. Although the additive may be mixed with the thermoplastic polyurethane and the crosslinking agent before the extrusion reaction, it may be added after the crosslinking process is finished if it can affect the reaction.

For preparation of the crosslinked polyurethane, the extrusion reaction may be performed in an extruder equipped with a feeder, a cooling bath and a pelletizer. Specifically, the extrusion reaction may be performed with the barrel temperature maintained at 150° C. so that crosslinking can occur sufficiently. The barrel temperature may be maintained more specifically at 150-230° C., further more specifically at 160-220° C. During the extrusion reaction, the screw rotation speed may be maintained at 30-300 rpm to ensure sufficient crosslinking.

An extruded strand discharged from a nozzle head after the extrusion reaction is cooled sufficiently as it passes through the cooling bath. Then, it is prepared into a pellet form by the pelletizer. Through this process, a crosslinked polyurethane outer cover composition can be obtained.

The crosslinked polyurethane golf ball outer cover can be prepared by injection molding rather than by the previous casting method.

After the injection molding, the polyurethane golf ball outer cover may be annealed at 50-110° C. for about 2-24 hours to further enhance mechanical and thermal properties.

The golf ball of the present disclosure includes a core, which has a single-core, dual-core or triple-core structure.

Specifically, cured polybutadiene (PBR) rubber may be used as the core. The cured rubber may be prepared by thermal forming of rubber stock at a temperature of 150-170° C. under a pressure of 150-200 ton. The cured rubber may be formed from the PBR as well as ZDA (zinc diarcylate), zinc oxide, a peroxide initiator, an oxidation stabilizer, etc.

The golf ball may further include an inner cover between the core and the outer cover, and the inner cover may contain an ionomer resin, which is a copolymer of ethylene and unsaturated carboxylic acid with a part of the unsaturated carboxylic acid being neutralized with a monovalent or divalent metal ion. The ionomer resin may be SURLYN®. Specifically, SURLYN® HPF1000, HPF2000, HPF AD1035, HPF AD1040, SURLYN® 6120, 7930, 7940, 8320, 8940, 9910, 9970, etc. may be used either alone or in combination.

The inner cover may be formed by injection molding on the surface of the golf ball core.

Accordingly, the golf ball of the present disclosure may be a three-piece, four-piece or five-piece golf ball depending on the core constituting the golf ball and the number of layers of the cover, although not being limited thereto.

The golf ball of the present disclosure exhibits excellent driving distance and spin performance and has greatly improved scuff resistance and light resistance.

Hereinafter, the present disclosure is described in more detail through examples and test examples. However, the examples according to the present disclosure may be changed into various different forms and it should not be interpreted that the scope of the present disclosure is limited by the examples described below. The examples of the present disclosure are provided to more fully describe the present disclosure to those having ordinary knowledge in the art.

Preparation Example 1: Preparation of Novel Crosslinking Agent Compound 228 g (1.5 mol) of vanillin represented by Chemical Formula 5 was added to a 1-L round-bottom flask and melted while maintaining temperature at 80° C.

[Chemical Formula 5]

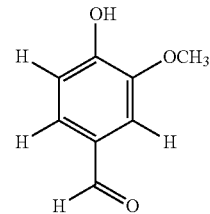

Then, after adding 110 g (0.5 mol) of Jeffamine® T-403, which is a triamine compound, a crosslinking agent compound was prepared by conducting reaction for about 5 hours in vacuo while removing water completely.

Figure 2:
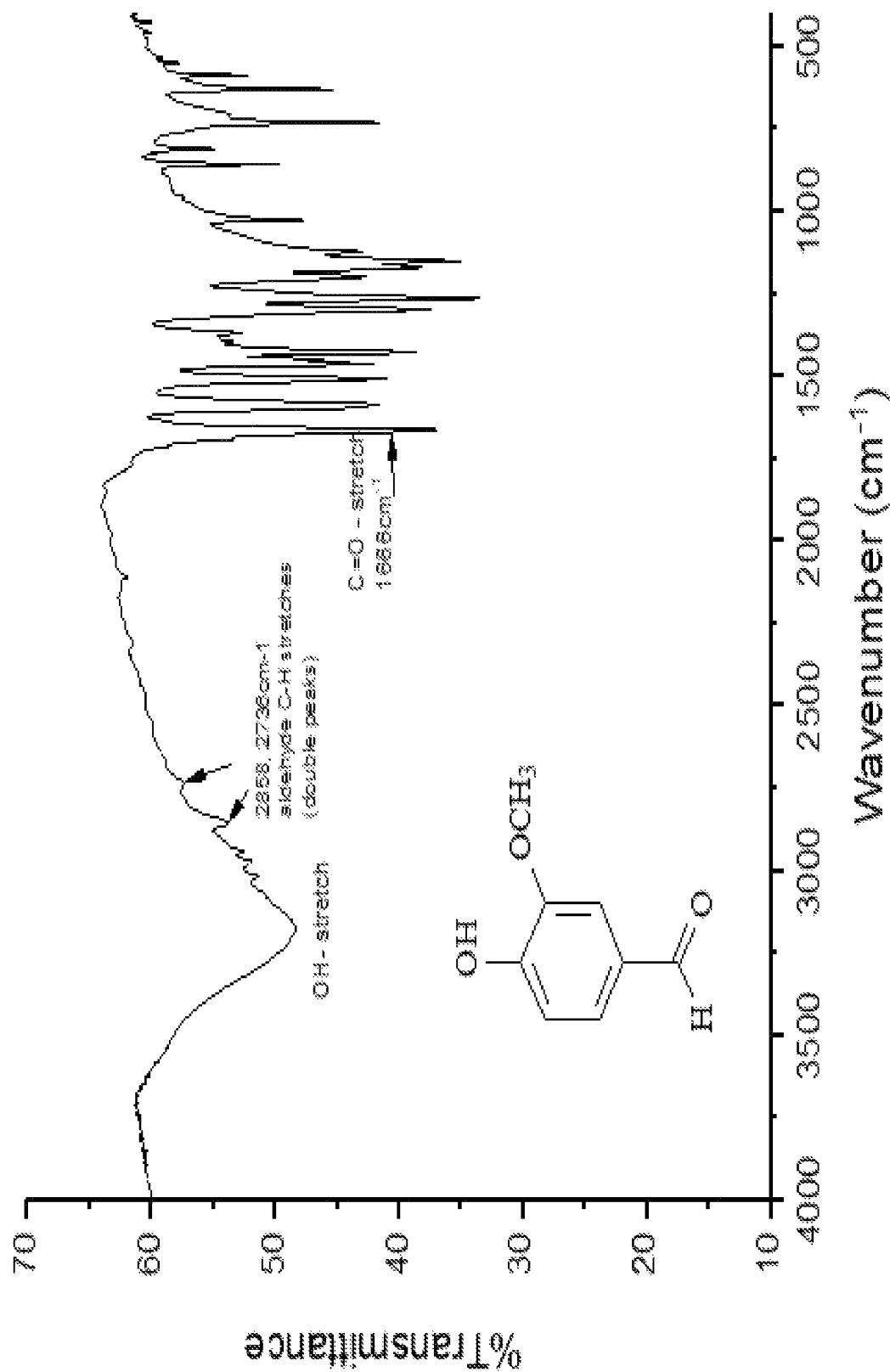
FIG. 2 shows the FT-IR spectrum of vanillin (4-hydroxy-3-methoxybenzaldehyde).
Figure 3:
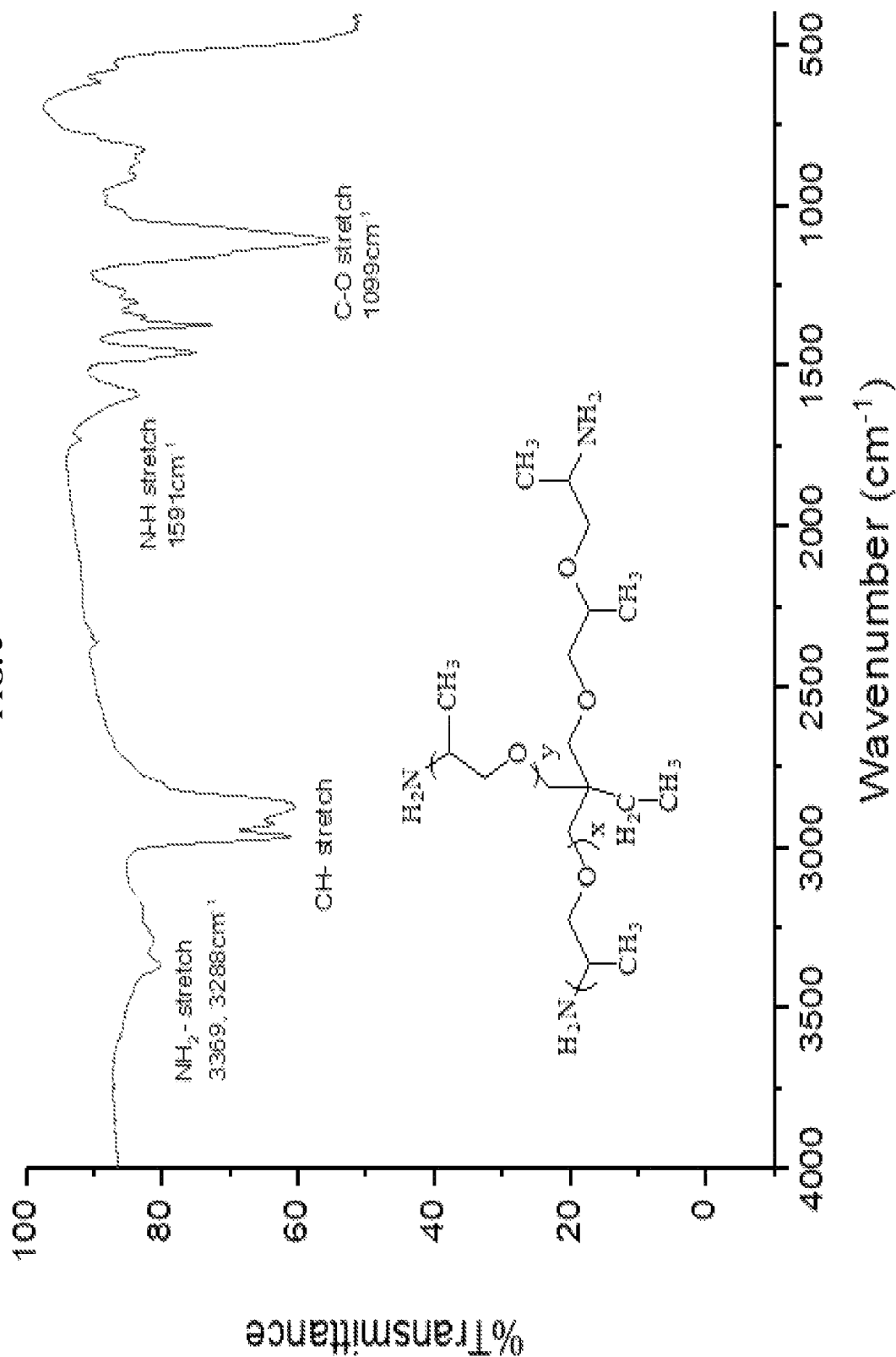
FIG. 3 shows the FT-IR spectrum of Jeffamine® T-403.

The FT-IR spectra of the prepared crosslinking agent compound and the reactants vanillin and Jeffamine® T-403 are shown respectively in FIGS. 1-3.

The carbonyl peak (C=O, 1666 cm$^{-1}$) of the aldehyde group in vanillin is clearly observed in FIG. 2, and the primary amine peaks (—NH$_2$ stretching, 3369, 3288 cm$^{-1}$, NH stretching 1591 cm$^{-1}$) of Jeffamine® T-403 are clearly observed in FIG. 3.

As seen from FIG. 1, the carbonyl peak and amine peaks disappeared in the crosslinking agent compound and a new imine peak (C=N, 1643 cm$^{-1}$) appeared, suggesting that an imine group was formed by condensation.

Figure 4:
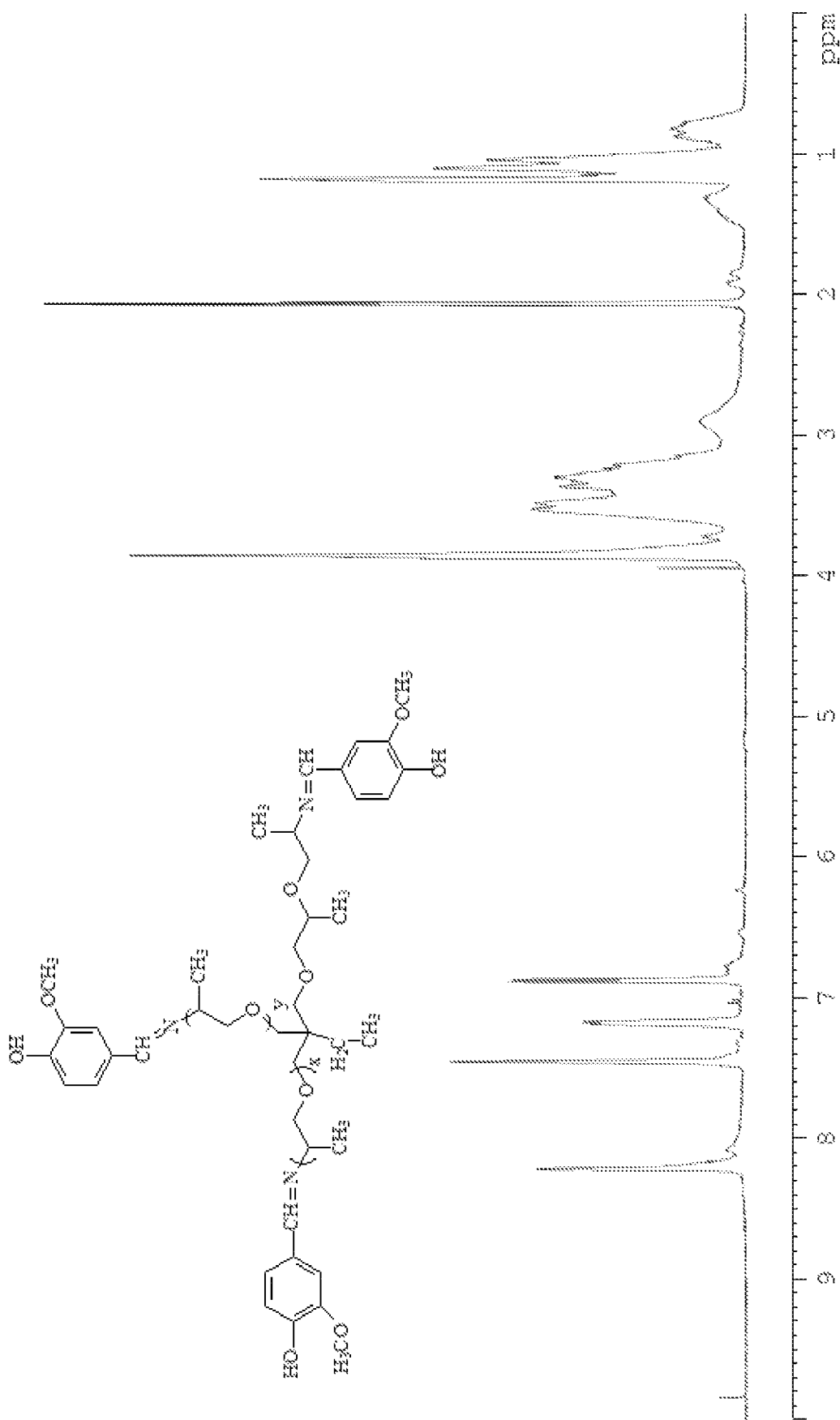
FIG. 4 shows the $^1$H NMR spectrum of a crosslinking agent prepared in Preparation Example 1.
Figure 5:
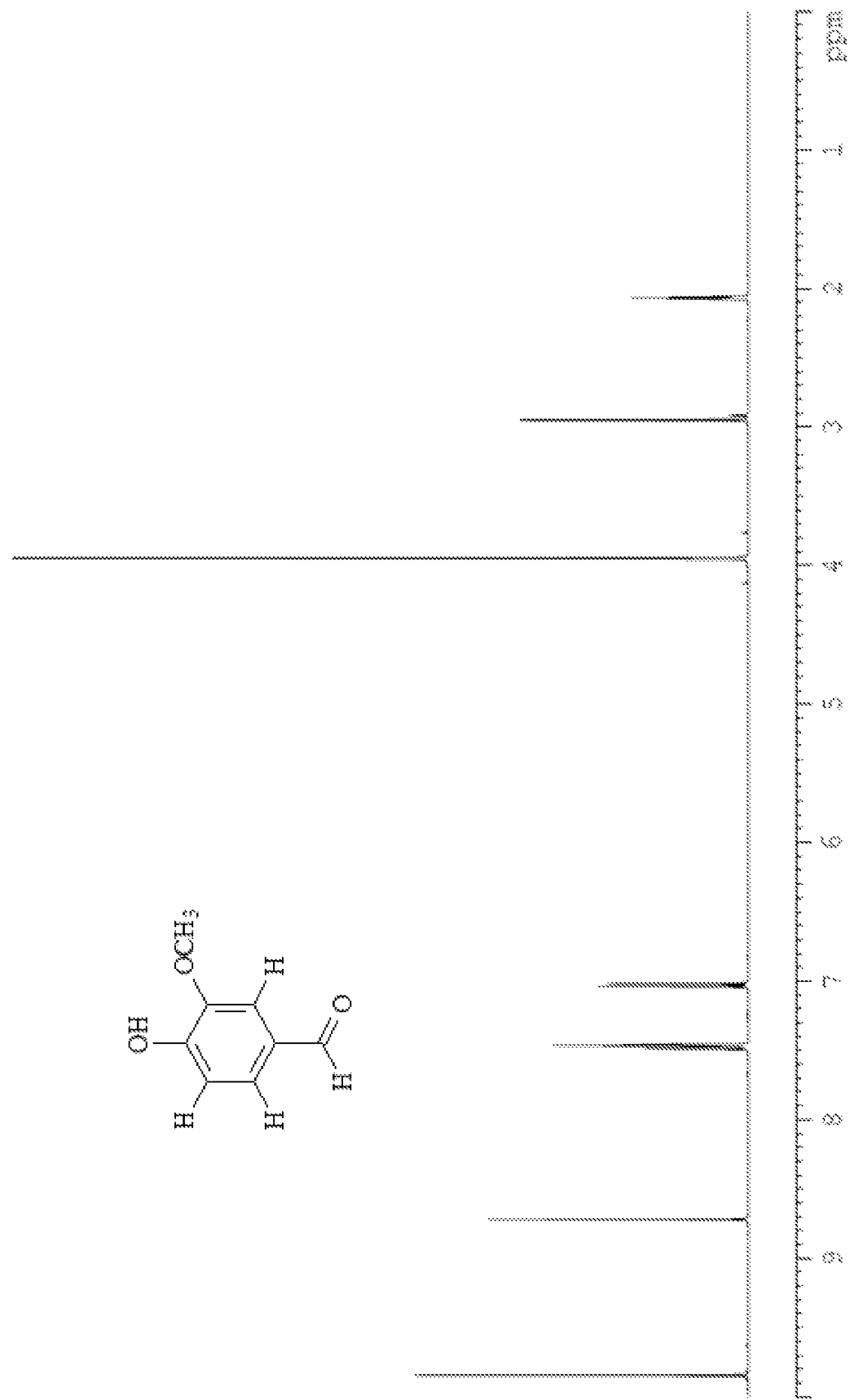
FIG. 5 shows the $^1$H NMR spectrum of vanillin (4-hydroxy-3-methoxybenzaldehyde).
Figure 6:
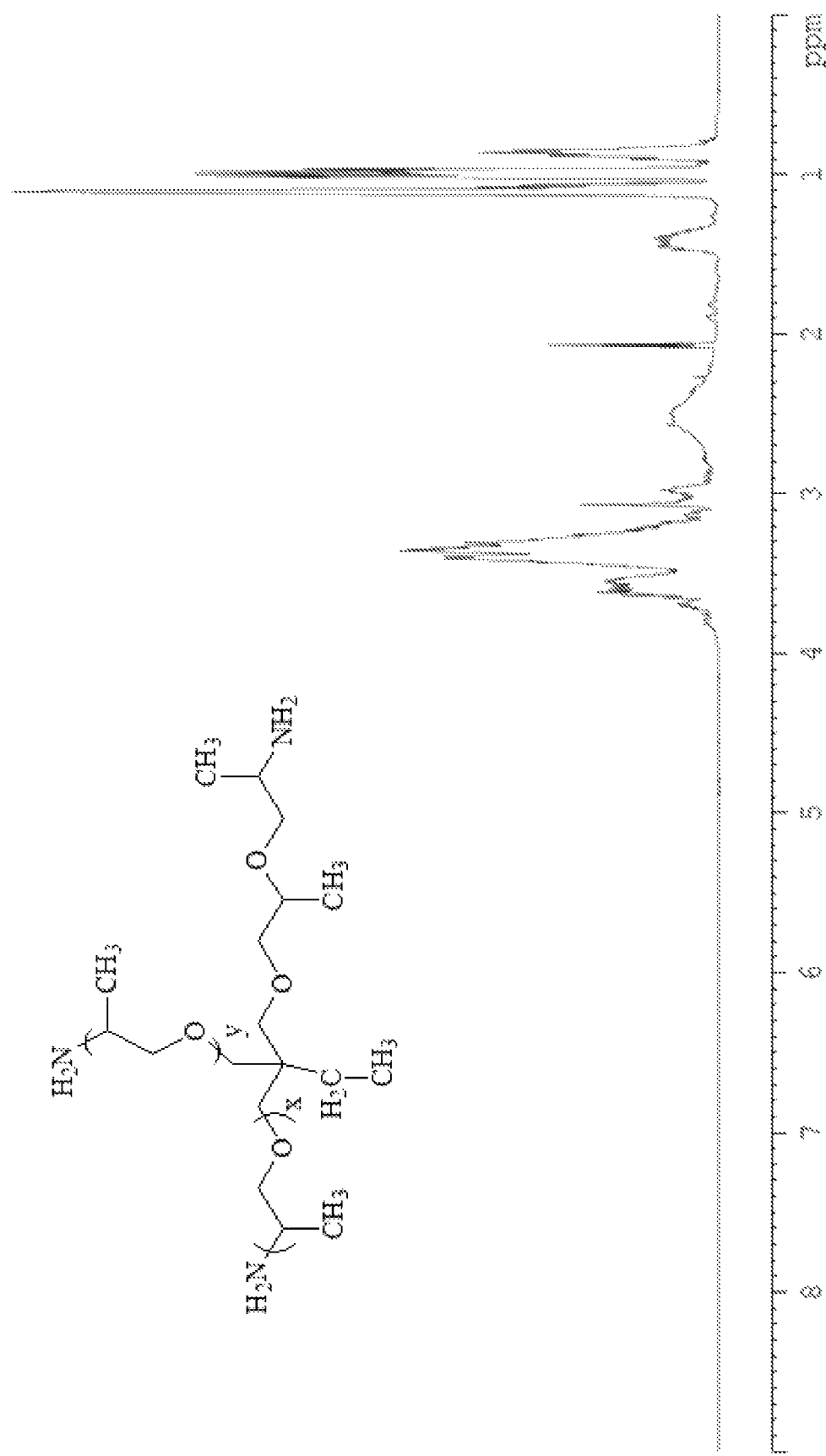
FIG. 6 shows the $^1$H NMR spectrum of Jeffamine® T-403.

The $^1$H NMR spectra of the prepared crosslinking agent compound and the reactants vanillin and Jeffamine® T-403 are shown respectively in FIGS. 4-6.

As seen from FIG. 4, the aldehyde peak δ 9.84 (s, 1H) of vanillin and the amine peaks δ 2.2-2.6 (broad, 2H) of Jeffamine® T-403 disappeared in the crosslinking agent compound and a characteristic peak of an imine group appeared at δ 8.20 (d, 3H), suggesting that an imine group was formed by condensation.

<Prepared Crosslinking Agent Compound>

$^1$H NMR (400 MHz, acetone-d$_6$): δ 0.77-0.92 (m, 3H), 1.0-1.2 (m, 9H), 1.20-1.50 (m, 9H), 2.90 (b, 2H), 3.1-3.8 (m, 18H), 3.85 (m, 9H), 6.85 (d, 3H), 7.18 (t, 3H), 7.45 (s, 3H), 8.20 (d, 3H).

<Vanillin>

$^1$H NMR (400 MHz, acetone-d$_6$): δ 3.95 (s, 3H), 7.02 (d, 1H), 7.47 (m, 2H), 8.72 (s, 1H), 9.84 (s, 1H).

<Jeffamine® T-403>

$^1$H NMR (400 MHz, acetone-d$_6$): δ 0.77-0.92 (m, 3H), 1.0-1.2 (m, 9H), 1.20-1.50 (m, 9H), 2.90 (b, 2H), 3.1-3.8 (m, 18H), 3.85 (m, 9H), 6.85 (d, 3H), 7.18 (t, 3H), 7.45 (s, 3H), 8.20 (d, 3H).

Examples 1-4 and Comparative Example 1-3:
Preparation of Crosslinked Polyurethane Examples 1-4

A crosslinking agent composition was obtained by mixing the alicyclic polyisocyanurate t-IPDI (Vestanat T1890, Evonik) and the compound prepared in Preparation Example 1 at a weight ratio of 1:1.

Then, 1, 3, 5 or 10 parts by weight of the crosslinking agent composition was dry-mixed with 100 parts by weight of thermoplastic polyurethane (Elastollan NY95A, non-yellowing type, BASF) under nitrogen atmosphere as described in Table 1.

The mixture was extruded using a twin-screw extruder with L/D=40 under the condition of feeder speed 3.0 rpm, screw speed 110 rpm and barrel temperature 160-220° C.

The extrusion product was cooled by passing through a cooling bath and then the crosslinked polyurethane was prepared into pellet shape by passing through a pelletizer.

Comparative Example 1

A pellet was prepared in the same manner as in the examples except that a crosslinking agent was not used.

Comparative Example 2

A pellet was prepared in the same manner as in the examples except that 3 parts by weight of aromatic isocyanate MDI (methylene diphenyl diisocyanate) was mixed with 100 parts by weight of thermoplastic polyurethane.

Comparative Example 3

A pellet was prepared in the same manner as in the examples except that 3 parts by weight of polyisocyanurate t-IPDI (Vestanat T1890, Evonik) was mixed as a crosslinking agent with 100 parts by weight of thermoplastic polyurethane (Elastollan 1195A, BASF), which is yellowing type aromatic thermoplastic polyurethane.

Measurement of Degree of Crosslinking

The gel content of the crosslinked polyurethane obtained in Examples 1-4 and Comparative Examples 1-3 was measured to investigate the degree of crosslinking. After adding about 1.5 g of the pellet-shaped crosslinked polyurethane to 50 mL of DMF (dimethylformamide) and stirring at 25±3° C. for 24 hours, crosslinked urethane in the form of swollen gel without being dissolved was filtered through glass fiber filter (GF/A φ 47 mm) under reduced pressure. Then, gel content (wt %) was measured by weighing in an oven at 110° C. The result is shown in Table 1.

As seen from Table 1, it was confirmed that crosslinked polyurethane was formed by extrusion of thermoplastic polyurethane using a crosslinking agent in Examples 1-4 and Comparative Examples 2-3. In particular, it can be seen that the degree of crosslinking (gel content, wt %) was increased as the content of the crosslinking agent was increased from 1 to 10 parts by weight in Examples 1-4.

However, Example 2 and Comparative Example 3 showed significant difference in gel content as 56 wt % and 20 wt % although the content of the crosslinking agent was the same as 3 parts by weight.

It is thought that this significant difference is caused by the chemical structure of the hard segment of TPU used for preparation of the crosslinked polyurethane. Whereas non-yellowing type aliphatic TPU (aliphatic TPU) was used in Example 2, aromatic TPU was used in Comparative Example 3. It is thought that the reason why crosslinking was not achieved sufficiently at the same crosslinking agent content when aromatic TPU was used in Comparative Example 3 is because of the very strong assembly of hard segments owing to the π-π stacking of aromatic benzene rings constituting the hard segments, leading to relatively difficult reaction with the crosslinking agent even at the extrusion reaction temperature of 200° C. or higher.

Accordingly, for preparation of injection-molded crosslinked polyurethane for a golf ball cover, it is preferred to use non-yellowing type aliphatic TPU, which allows easier opening of the hard segment, rather than aromatic TPU.

Meanwhile, the result of measuring the gel content of Examples 1-4, it can be seen that injection molding is difficult if the crosslinking agent is 10 parts by weight or higher because the degree of crosslinking becomes 90 or higher, and that significant improvement in tear strength, scuff resistance, etc. cannot be expected if the degree of crosslinking becomes 20 or lower.

For Comparative Example 1, the gel content was 0 because TPU was not crosslinked but was completely dissolved in DMF.

Measurement of Light Resistance

The crosslinked polyurethane obtained in Examples 1-4 and Comparative Examples 2-3 and the polyurethane of Comparative Example 1 was subjected to light resistance testing.

First, after preparing a test sample with a size of 20 mm×20 mm×2 mm by injection molding, color change (ΔE) upon exposure to light was measured. The result is shown in Table 1.

The temperature-controllable chamber LT400-50HP (TNE Tech) was used for the light resistance testing, and BYK's Spectro guide model was used as a colorimeter.

The light resistance testing was conducted by exposing to artificial solar light with an irradiance of 1 SUN (1,000 W/m$^2$) for 120 hours at a chamber temperature of 25° C. After the light exposure, the color change (ΔE) of the sample before and after the testing was measured with the colorimeter. The color change is defined by $\Delta E=[(\Delta L)^2+(\Delta a)^2+(\Delta b)^2]^{1/2}$, or the square root of the sum of the squares of the change in color lightness (L) and hues (a, b). It reflects the overall change in color.

As a result of measuring the color change of the crosslinked polyurethane obtained in Examples 1-4 of the present disclosure, the color change was hardly distinguishable visually with ΔE less than 2, as shown in Table 1. In contrast, Comparative Examples 2-3 showed visually distinguishable color change with ΔE of 8.5 and 11.6, respectively.

Accordingly, it can be seen that the crosslinked polyurethane obtained by crosslinking aliphatic TPU with non-aromatic isocyanate as in Examples 1-4 can be used for a cover of a colored golf ball.

Measurement of Strength

The mechanical properties of the crosslinked polyurethane obtained in Examples 1-4 and Comparative Examples 2-3, such as hardness (Shore D), tensile strength, tear strength, etc., were tested.

A test sample was prepared by injection molding and hardness was measured according to ASTM D2240 using a Shore D hardness tester (Zwick, Germany). Tensile strength and tear strength were measured according to ASTM D412 and ASTM D 624, respectively, using Cometech's UTM (QC-506M2). The results are shown in Table 1.

It was confirmed that the crosslinked polyurethane of Examples 1-4 showed increased hardness, tensile strength and tear strength as compared to the uncrosslinked polyurethane of Comparative Example 1.

TABLE 1

| | | Example | | | | Comparative Example | | |
|---|---|---|---|---|---|---|---|---|
| | | 1 | 2 | 3 | 4 | 1 | 2 | 3 |
| Composition of crosslinked urethane | TPU (parts by weight) | 100 | 100 | 100 | 100 | 100 | 100 | 100 (aromatic) |
| | Crosslinking agent (parts by weight) | 1 | 3 | 5 | 10 | 0 | 3 (aromatic) | 3 |
| Degree of crosslinking (gel content, wt %) | | 30 | 56 | 80 | 95 | 0 | 64 | 20 |
| Light resistance (ΔE) | | 0.74 | 0.93 | 0.86 | 1.10 | 0.90 | 8.5 | 11.6 |
| Strength | hardness (Shore D) | 43 | 45 | 47 | 48 | 43 | 45 | 40 |
| | Tensile strength (MPa) | 40 | 44 | 47 | 53 | 38 | 48 | 42 |
| | Tear strength (kgf/mm) | 8.2 | 9.1 | 10.5 | 11.0 | 5.3 | 9.0 | 7.8 |

Examples 5-8 and Comparative Examples 4-7:
Preparation of Cover Composition

Examples 5-8

100 parts by weight of the crosslinked polyurethane prepared in Example 2 or 3 was mixed with a pigment (white, yellow, orange or green color) at a content described in Table 2.

The mixture was extruded using an extruder with L/D=40 under the condition of feeder speed 3.0 rpm, screw speed 120 rpm and barrel temperature 170-190° C. After cooling, a crosslinked polyurethane cover composition was prepared by passing through a pelletizer.

Comparative Examples 4-5

A polyurethane cover composition was prepared in the same manner as in Examples 5-8 except that the thermoplastic polyurethane of Comparative Example 1 was mixed with 2 parts by weight of a white pigment and 0.3 part by weight of a yellow pigment as described in Table 2.

Comparative Examples 6-7

A polyurethane cover composition was prepared in the same manner as in Examples 5-8 except that the crosslinked polyurethane prepared in Comparative Example 2 or 3 was mixed with 0.3 parts by weight of a yellow pigment and an orange pigment, respectively, as described in Table 2.

In order to investigate the light resistance of the cover compositions obtained in Examples 5-8 and Comparative Examples 4-7, color change was measured as described above. The results are shown in Table 2.

TABLE 2

| | | Example | | | | Comparative Example | | | |
|---|---|---|---|---|---|---|---|---|---|
| | | 5 | 6 | 7 | 8 | 4 | 5 | 6 | 7 |
| Cover composition | Crosslinked urethane (Example 2) | 100 | 100 | 100 | — | — | | — | |
| | Crosslinked urethane (Example 3) | — | — | — | 100 | — | | — | |
| | thermoplastic Polyurethane (Comparative Example 1) | | | | | 100 | 100 | | |
| | Crosslinked urethane (Comparative Example 2) | | | | | | | 100 | |
| | Crosslinked urethane (Comparative Example 3) | | | | | | | | 100 |
| | Pigment, white | 2 | | | | 2 | | | |
| | Pigment, yellow | | 0.3 | | | | 0.3 | 0.3 | |
| | Pigment, orange | | | 0.3 | | | | | 0.3 |
| | Pigment, green | | | | 0.3 | | | | |
| | Light resistance (ΔE) | 0.52 | 1.20 | 1.05 | 0.83 | 0.74 | 0.69 | 10.70 | 12.0 |

As seen from Table 2, the color change for the cover compositions of Examples 5-8 was almost visually undistinguishable with ΔE of 0.83-1.20, confirming that they have excellent light resistance.

However, the cover compositions of Comparative Examples 6-7 had the color change ΔE values of 10.7-12.0, significantly different from those of Examples 5-8, indicating that they have light resistance problems.

Preparation of Golf Ball

Golf balls were prepared using the cover composition of Examples 5-8 and Comparative Examples 4-5. Three-piece (one core+two covers) golf balls were prepared by forming the polyurethane outer cover on the core and the inner cover. The driving distance, spin and scuff resistance of the golf balls were tested. The results are shown in Table 3.

As the golf ball core, a single core with a diameter 38.70 mm prepared from cured polybutadiene rubber was used. As the inner cover, ionomer resin (Surlyn® 8940 and 9910 blended at a weight ratio of 50/50) was injection-molded on the single core to a thickness 1.00, 1.20 or 1.50 mm.

The polyurethane outer cover was formed by injection-molding on the surface of the inner cover. The thickness of the outer cover was set to 0.5, 0.8 or 1.0 mm. The outer cover was molded using the Insert 100, vertical-type injection molding machine (Engel, Germany). A hot runner mold was used, and a cavity with 332 dimples was used.

The total thickness of the golf ball cover prepared in this example was 2.00 mm, including the outer urethane layer and the inner ionomer layer.

The three-piece golf ball prepared in this example had a weight of 45.50-45.70 g and a diameter of 42.70-42.75 mm. The results of measuring the driving distance, spin and scuff resistance of each golf ball are shown in Table 3.

It can be seen that the driving distance of the golf ball prepared from the cover composition of the examples of the present disclosure decreases gradually as the thickness of the polyurethane outer cover is increased. This is due to the soft material property of urethane.

Accordingly, in order to increase the driving distance of the golf ball, it is preferred to decrease the thickness of the urethane cover. However, when the thickness is decreased, although the driving distance is increased, the cover may be damaged when the golf ball is hit by a driver, an iron or a wedge due to poor scuff resistance.

It was confirmed that scuff resistance was excellent when the crosslinked polyurethane of Examples 5-8 was used as compared to when the polyurethane of Comparative Examples 4-5 was used.

In particular, the golf ball of Example 5 was excellent not only in driving distance and spin but also in scuff resistance even when the thickness of the outer cover was decreased to 0.5 mm. This confirms that the thickness of the cover prepared from the crosslinked polyurethane of the present disclosure can be decreased to about 0.5 mm.

Accordingly, the cover thickness of the polyurethane golf ball using the crosslinked polyurethane of the present disclosure can be determined to be specifically 1.0 mm or smaller, more specifically to 0.4-0.8 mm, in consideration of driving distance.

The golf ball characteristics described in Table 3 were measured as follows.

Driving distance (m): The mechanical golfer Iron Byron (True Temper Sports, USA) was used. The sum of carry distance and run distance when the golf ball was hit by a titanium driver with a loft angle of 10.5° and a head speed of 44.7 m/sec (100 mph) was measured.

Spin (RPM): The spin (revolutions per minute) was measured with Trackman when the golf ball was hit by the same mechanical golfer as in the driving distance measurement with a wedge angle of 52° and a head speed of 31 m/sec.

Scuff resistance: After keeping the golf ball at 23° C. and hitting it with a swing robot and a pitching wedge with a head speed of 33 m/s, the state of the golf ball surface was evaluated as follows.

⊚: No or hardly visible surface scratch.
○: Slight surface scratch little concern.
Δ: Slightly fluffy surface.
X: Cut or broken surface.

Although the inventions are shown in the exemplary embodiments, those skilled in the art will appreciate that many variations and modifications can be made to the embodiments without substantially departing from the principles of the present inventive concept. Therefore, the disclosed embodiments of the invention are used in a generic and descriptive sense only and not for purposes of limitation. The scope of protection of the present inventive concept should be interpreted by the following claims, and all technical ideas within the scope equivalent thereto should be construed as being included in the scope of the technical idea defined by the present disclosure.

What is claimed is:

1. A golf ball comprising:
a core comprising a polybutadiene rubber;
an inner cover comprising an ionomer resin; and
an outer cover comprising crosslinked polyurethane formed by reaction of thermoplastic polyurethane and a crosslinking agent,
wherein the crosslinking agent comprises an isocyanate crosslinking agent and a compound represented by Chemical Formula 1:

TABLE 3

| Golf ball characteristics | Example | | | | Comparative Example | |
| --- | --- | --- | --- | --- | --- | --- |
| | 5 | 6 | 7 | 8 | 4 | 5 |
| Cover color | White | Yellow | Orange | Green | White | Yellow |
| Cover hardness | 45 | 46 | 45 | 47 | 43 | 45 |
| Outer cover thickness | 0.50 | 0.80 | 1.00 | 1.00 | 0.80 | 1.00 |
| Inner cover thickness | 1.50 | 1.20 | 1.00 | 1.00 | 1.20 | 1.00 |
| Core size | 38.7 | | | | 38.7 | |
| Driving distance (m) | 240 | 238 | 234 | 235 | 237 | 235 |
| Spin (rpm) | 9445 | 9479 | 9505 | 9946 | 9430 | 9440 |
| Scuff resistance | ○ | ⊚ | ⊚ | ⊚ | X~Δ | X~Δ |

[Chemical Formula 1]

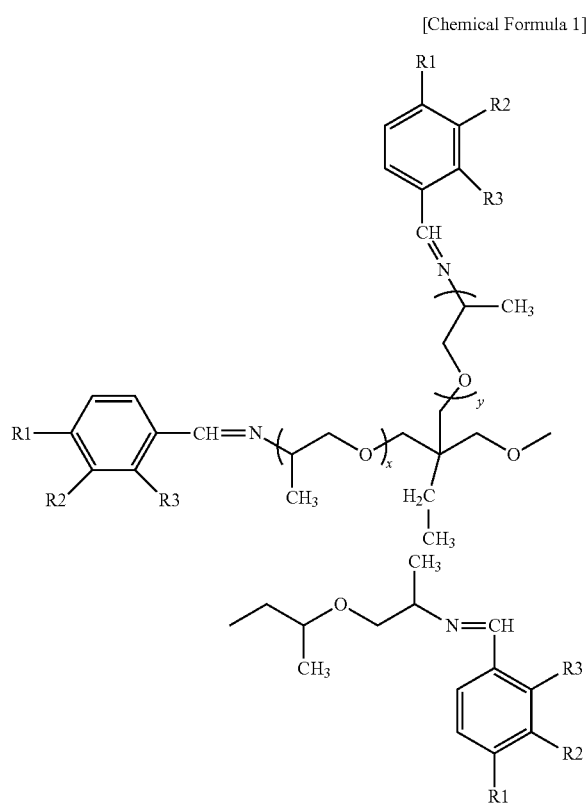

wherein
each of R1, R2 and R3 is independently H, OH or a $C_1$-$C_{10}$ alkoxy group, with one of R1, R2 and R3 being OH, and
each of x and y is independently an integer of 1-2.

2. The golf ball according to claim 1, wherein the thermoplastic polyurethane is obtained by reacting at least one long-chain polyol selected from a group consisting of aliphatic polyether polyol and polyester polyol.

3. The golf ball according to claim 1, wherein the thermoplastic polyurethane is obtained by reacting at least one diisocyanate selected from a group consisting of HDI (hexamethylene diisocyanate), IPDI (isophorone diisocyanate), $H_{12}$MDI (4,4'-dicyclohexylmethane diisocyanate) and 1,4-$H_6$XDI (1,4-hydrogenated xylene diisocyanate).

4. The golf ball according to claim 1, wherein the thermoplastic polyurethane comprises at least one chain extender selected from ethylene glycol, diethylene glycol, 1,3-propanediol, 1,3-butanediol, 1,4-butanediol, 1,5-pentanediol, 1,6-hexanediol, bishydroxymethylcyclohexane and cyclohexane-1,4-diol.

5. The golf ball according to claim 1, wherein the crosslinked polyurethane has a Shore D hardness of 30-60.

6. The golf ball according to claim 1, wherein the isocyanate crosslinking agent is at least one compound selected from MDI (methylene diphenyl diisocyanate), polymeric MDI, TDI (toluene diisocyanate), HDI (hexamethylene diisocyanate), IPDI (isophorone diisocyanate), $H_{12}$MDI (dicyclohexylmethane diisocyanate), MDI isocyanurate (t-MDI), TDI isocyanurate (t-TDI), HDI isocyanurate (t-HDI) and IPDI isocyanurate (t-IPDI).

7. The golf ball according to claim 1, wherein the crosslinked polyurethane is formed as 100 parts by weight of the thermoplastic polyurethane reacts with 0.1-20 parts by weight of the crosslinking agent.

8. The golf ball according to claim 1, wherein the crosslinked polyurethane has a degree of crosslinking of 10-90.

9. The golf ball according to claim 1, wherein the crosslinked polyurethane experiences color change (ΔE) of 8 or less after exposure to irradiance of 1 SUN (1,000 W/m²) for 120 hours.

10. The golf ball according to claim 1, wherein the ionomer resin is a copolymer of ethylene and unsaturated carboxylic acid with a part of the unsaturated carboxylic acid being neutralized with a monovalent or divalent metal ion.

* * * * *

UNITED STATES PATENT AND TRADEMARK OFFICE
CERTIFICATE OF CORRECTION

| | | |
|---|---|---|
| PATENT NO. | : 11,779,814 B2 | Page 1 of 1 |
| APPLICATION NO. | : 17/370193 | |
| DATED | : October 10, 2023 | |
| INVENTOR(S) | : Chul Ho Song et al. | |

It is certified that error appears in the above-identified patent and that said Letters Patent is hereby corrected as shown below:

On the Title Page

Item (72) The inventor names should be corrected to as below;
Chul Ho Song, Gyeonggi-do, (KR)
Seung Geun Park, Chungcheongbuk-do, (KR)
Geon Sim, Seoul, (KR)
Kyung Ahn Moon, Seoul, (KR)

Signed and Sealed this
Fourteenth Day of November, 2023

Katherine Kelly Vidal
*Director of the United States Patent and Trademark Office*